United States Patent
Casier et al.

(10) Patent No.: US 6,771,770 B2
(45) Date of Patent: Aug. 3, 2004

(54) HYBRID CIRCUIT FOR A BROADBAND MODEM

(75) Inventors: Herman Joris Casier, Kuurne (BE); Olivier Latte, Groot-Bijgaarden (BE); Patrick Wouters, Merchtem (BE); Daniël Sallaerts, Aarschot (BE)

(73) Assignee: Alcatel, Paris (FR)

( * ) Notice: Subject to any disclaimer, the term of this patent is extended or adjusted under 35 U.S.C. 154(b) by 313 days.

(21) Appl. No.: 10/097,013

(22) Filed: Mar. 14, 2002

(65) Prior Publication Data

US 2002/0176569 A1 Nov. 28, 2002

(30) Foreign Application Priority Data

Mar. 15, 2001 (EP) ............................................. 01400682

(51) Int. Cl.[7] .............................................. H04M 1/00
(52) U.S. Cl. .................................. 379/402; 379/390.04
(58) Field of Search ........................... 379/399.01, 402, 379/405, 390.04, 345

(56) References Cited

U.S. PATENT DOCUMENTS

| | | |
|---|---|---|
| 3,479,468 A | 11/1969 | Kretzmer |
| 3,973,089 A | 8/1976 | Puckette |
| 4,346,266 A | 8/1982 | Brockmann et al. |
| 5,734,703 A * | 3/1998 | Hiyoshi ...................... 379/402 |
| 6,163,579 A | 12/2000 | Harrington et al. |

FOREIGN PATENT DOCUMENTS

| WO | WO 99/45655 | 9/1999 |
|---|---|---|

* cited by examiner

*Primary Examiner*—Minsun Oh Harvey
*Assistant Examiner*—Jefferey Harold
(74) *Attorney, Agent, or Firm*—Sughrue Mion, PLLC

(57) ABSTRACT

A hybrid circuit that couples a broadband modem to a POTS or ISDN telecommunication line (TL) and comprises a transformer bridge circuit (TBC) that includes a bridge circuit (BC). The bridge circuit is constituted by four legs of which a first (A) and a second (B) nodes, that do not belong to a same leg, are connected to the two outputs of a differential drive amplifier (DRV) that performs impedance synthesis. A first leg is made of a first impedance matching network (Zm1) connected between the second node (B) and a third node (C). A second leg is made of a first primary winding (TP1) of a transformer and is connected between the third (C) and the first (A) nodes. A third leg is made of a second impedance matching network (Zm2) connected between the first node (A) and a fourth node (D). A forth leg is made of a second primary winding (TP2) of the transformer and is connected between the fourth (D) and second (B) nodes. A secondary winding (TS) of the transformer is magnetically coupled to the first and the second primary windings and is electrically coupled to the telecommunication line. A first impedance divider (Zhin1, Zhout1) is connected between the third (C) and first (A) nodes and has a first central node (E), whilst a second impedance divider (Zhin2, Zhout2) is connected between the fourth (D) and second (B) nodes and has a second central node (F). A receive amplifier (RCV) has inputs connected to the first (E) and second (F) central nodes. The impedance matching networks (Zm1; Zm2) include various passive and reactive components that provides together an impedance value selected based upon the line impedance reflected into the primary windings (TP1; TP2) of the transformer. To perform the impedance synthesis, the drive amplifier (DRV) is a differential drive amplifier having feedback inputs (FB−, FB+) to which the third (C) and fourth (D) nodes are connected.

10 Claims, 4 Drawing Sheets

HYBRID CIRCUIT FOR A BROADBAND MODEM

The present invention relates to a hybrid circuit adapted to couple a broadband modem to a telecommunication line, said hybrid circuit comprising a transformer bridge circuit including a bridge circuit coupled between a drive amplifier and a receive amplifier, and a transformer of which a secondary winding is electrically coupled to said telecommunication line, said bridge circuit comprising first, second, third and fourth nodes interconnected via four legs,
a first leg comprising a first impedance matching network coupled across said second and third nodes,
a second leg comprising a first primary winding of said transformer coupled across said first and third nodes,
a third leg comprising a second impedance matching network coupled across said first and fourth nodes, and
a fourth leg comprising a second primary winding of said transformer coupled across said second and fourth nodes,
the secondary winding of said transformer being magnetically coupled to said first and second primary windings,
said drive amplifier having outputs connected to said first and second nodes and being adapted to provide, at said output, an output signal derived from a transmit signal received from said modem, and
said receive amplifier having inputs coupled to said third and fourth nodes and being adapted to provide a receive output signal to be applied to said modem.

The hybrid circuit of the present invention is more particularly adapted for coupling a broadband modem to a telecommunication line that transports electrical signals in several frequency ranges that are not all used by the modem. The telecommunication line belongs for instance to a Plain Old Telephone System POTS or to an Integrated Services Digital Network ISDN, operating according to a Digital Subscriber Line protocol DSL, such as Asymmetric Digital Subscriber Line protocol ADSL, HDSL, HDSL2, RADSL, VDSL, etc . . .

Due to the increasing popularity of Digital Subscriber Lines DSL, network access providers require Central Office CO equipments that allow a high line density on the printed circuit boards. Fulfilling this requirement implies a reduction of the power consumption per line and a reduction of the area occupied by the off-chip circuitry.

Two basic architectures of hybrid circuits were the most used in the past: the so-called "three-transformers hybrid" and the classic resistive hybrid.

The three-transformers hybrid has weak points related to both the above issues: part of the power delivered by the line drive amplifier is uselessly dissipated in a balanced impedance, and transformers are big components. The three transformers of this known architecture occupy thus a large area on the board.

The classic resistive hybrid has the drawback of providing a high attenuation from the line connection to the receive connection. This basic architecture has however been improved and, at the present time, a hybrid circuit providing better results is obtained by an architecture as described above.

Such an hybrid circuit is already known in the art, e.g. from the U.S. Pat. No. 6,163,579 (WO 9945655) entitled "Broadband modem transformer hybrid" by Harrington, et al., filed on Mar. 4, 1998. Therein, is disclosed a hybrid circuit adapted to be used in a broadband modem coupled to a telephone line. This hybrid architecture is compact and characterized by a low attenuation from the line connection to the receive connection. The area occupied on the board is limited by the surface of the hybrid. However, this known hybrid circuit is not adapted to perform impedance synthesis.

The synthesis of impedance is a method commonly used to decrease the power consumption and output voltage swing of a drive amplifier whose output impedance has to match with a given value.

It can be proved that if an impedance synthesis was used in the above known patent, the impedance of the matching network would be smaller than the impedance reflected in the primary windings of the transformer. This would result in an unacceptable low trans-hybrid loss. In order to recover an infinite theoretical trans-hybrid loss, each node connected to the receive amplifier needs to be moved from the extremity of the primary winding of the transformer towards an intermediate connection into this primary winding. However, such an intermediate connection in the primary winding of a transformer is inaccessible and, additionally, its position may also vary as a function of the load.

An object of the present invention is to provide a hybrid circuit for a broadband modem of the above known type, but which is adapted to perform impedance synthesis, to have a low power consumption of the drive amplifier, to have infinite theoretical trans-hybrid loss and to occupy a relatively small area on the board.

According to the invention, this object is achieved due to the fact that said drive amplifier is a differential drive amplifier having feedback inputs and being adapted to perform impedance synthesis, that said third and fourth nodes are respectively connected to a first and to a second of said feedback inputs, and that said bridge circuit further comprises:

a first impedance divider coupled between said first and third nodes, and having a first central node to which a first input of said receive amplifier is connected, and
a second impedance divider coupled between said second and fourth nodes, and having a second central node to which a second input of said receive amplifier is connected.

In this way, and as will be explained later, the use of the impedance dividers and of a differential drive amplifier allows to perform impedance synthesis, whilst the area occupied on the board is relatively low. Additionally, the impedance synthesis leads to a relatively low power consumption of the drive amplifier and to an infinite theoretical trans-hybrid loss.

In a first possible embodiment, a resistive divider is placed in parallel with each primary winding. However, with a resistive divider across the primary winding, every mismatch between the impedance of the matching network and the impedance reflected into the primary winding leads to a decrease of the trans-hybrid loss. Using complex impedance dividers instead of resistive dividers solves this problem. The complex impedance may for instance be implemented in a network of passive components and is adapted to compensate for this mismatch and to improve the trans-hybrid loss.

As a result of the use of impedance synthesis, the ratio of the power dissipated in the impedance matching networks on the power delivered to the telecommunication line, i.e. the load, is dramatically decreased.

Compared to the above known three-transformers hybrid, the hybrid circuit of the present invention has the advantage of not including a balance impedance. This leads to less useless power dissipation. Moreover, the area occupied on the printed circuit board is obviously much smaller since only one transformer is needed instead of three.

Compared to the classic resistive hybrid, the attenuation from the telecommunication line connection to the receive amplifier is lower.

Another characterizing embodiment of the present invention is that said first and said second impedance matching networks have substantially identical impedance values, and that said first and said second impedance dividers have substantially identical impedance values.

A full balanced hybrid circuit is so obtained.

In a preferred embodiment, the present invention is further characterized in that said second and fourth legs each further comprise a reactive component.

This reactive component allows the hybrid circuit to act as a filter for preventing the broadband modem to receive signals at unwanted frequencies and to eliminate the out-of-band noise.

In a first variant of the present hybrid circuit, said reactive component is a capacitor connected in parallel with the corresponding primary winding of said transformer.

In a further variant of the present hybrid circuit, said reactive component is a capacitor connected in series with the corresponding primary winding of said transformer.

The impedance divider may then be coupled, across the nodes, in parallel with the series connected capacitor and primary winding.

Alternatively, in each of said second and fourth legs, the impedance divider is connected in parallel with the primary winding of said transformer.

The leg is then formed by this parallel connection in series with the reactive component.

In still another variant of the present hybrid circuit, a capacitor is connected in parallel with said secondary winding of said transformer.

Such a connection may also be combined with any of the above variants of the hybrid circuit.

Yet another variant of the present hybrid circuit is characterized in that said secondary winding of said transformer is electrically coupled to said telecommunication line via at least one capacitor.

All the above variants of the present hybrid circuit lead to add a filter between the modem and the telecommunication line. The resulting filtering effect is then added to the transmit-to-line, transmit-to-receive and line-to-receive transfer function of the hybrid circuit.

Summarizing, the impedance dividers are used to compensate for mismatch between the impedance of the matching networks and the impedance seen between the nodes of the second and fourth legs looking to the line through the transformer, and the reactive components are added for filtering purpose.

Further characterizing embodiments of the present Hybrid circuit for telecommunication line are mentioned in the appended claims.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only.

Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein.

Figure 1:
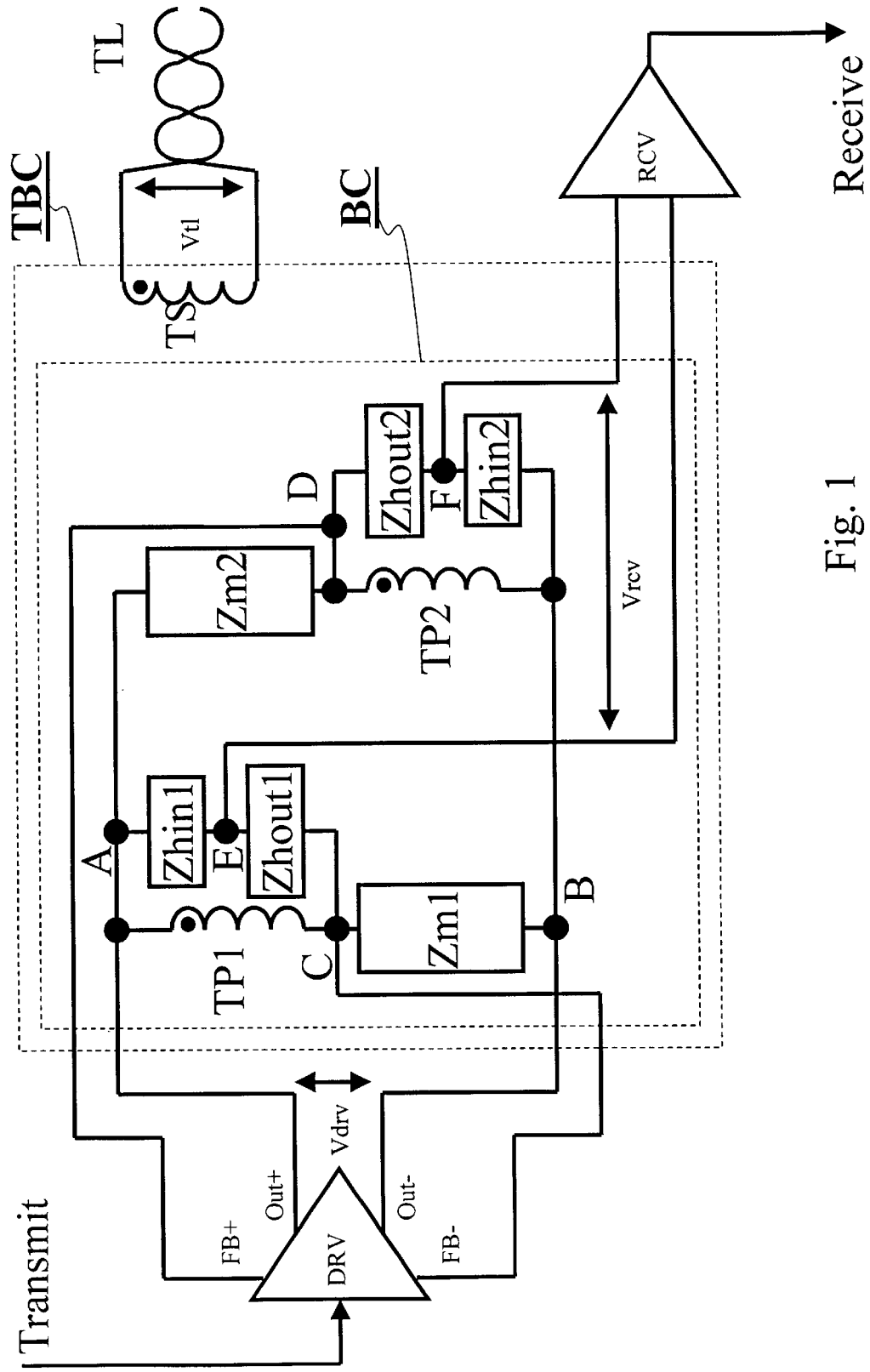
FIG. 1 represents a hybrid circuit according to the invention.

The hybrid circuit shown at FIG. 1 is adapted to couple a broadband modem, operating with signals at high frequencies, to a telecommunication line TL transporting electrical signals both at high frequencies and at relatively lower frequencies, according to a Plain Old Telephone System POTS or to an Integrated Services Digital Network ISDN. In other words, the telecommunication line operates according to a Digital Subscriber Line protocol DSL, such as Asymmetric Digital Subscriber Line protocol ADSL, HDSL, HDSL2, RADSL, VDSL, etc . . .

The hybrid circuit includes a drive amplifier or driver DRV, a receive amplifier or receiver RCV, and a transformer bridge circuit TBC coupling the driver to the receiver. The broadband modem has a Transmit output connected to an input of the driver DRV, whilst an output of the receiver RCV is connected to a Receive input of the modem.

The transformer bridge circuit TBC comprises a transformer and a bridge circuit BC that has four nodes A, B, C and D interconnected by four legs. Two nodes, say A and B, that do not belong to a same leg, are connected to two outputs Out+ and Out− of the Driver.

A first leg of the bridge circuit BC is made of a first impedance matching network Zm1 connected between the node B and the node C. A second leg is made of a first primary winding TP1 of the transformer and is connected between the nodes C and A. A third leg is made of a second impedance matching network Zm2 connected between the node A and the node D. A fourth leg is made of a second primary winding TP2 of the transformer and is connected between the nodes D and B. A secondary winding TS of the transformer is magnetically coupled to the first TP1 and second TP2 primary windings and is electrically coupled to the telecommunication line TL.

Additionally, a first impedance divider is connected between the nodes C and A. This first impedance divider comprises the series connection of a first input impedance Zhin1 and a first output impedance Zhout1 interconnected at a junction point E, called "central node". A second impedance divider is connected between the nodes D and B. This second impedance divider comprises the series connection of a second input impedance Zhin2 and a second output impedance Zhout2 with a junction point or central node F.

The drive amplifier DRV is a differential drive amplifier that, as will be explained later, can perform impedance synthesis owing to signals applied to two feedback inputs thereof FB+ and FB−. The nodes D and C are connected to the feedback inputs FB+ and FB− respectively.

On the other hand, the central nodes E and F are connected to distinct inputs of the receive amplifier RCV.

Figure 3:
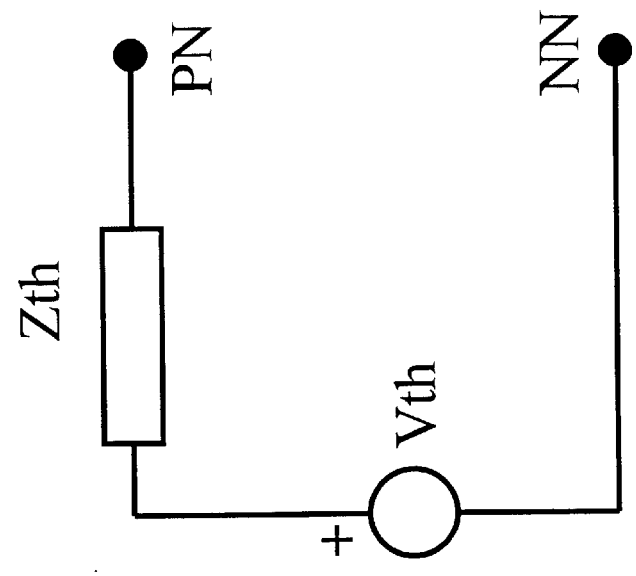
FIG. 3 shows a generic Thevenin equivalent of a load, used to explain the behavior of a drive amplifier DRV performing impedance synthesis.
Figure 2:
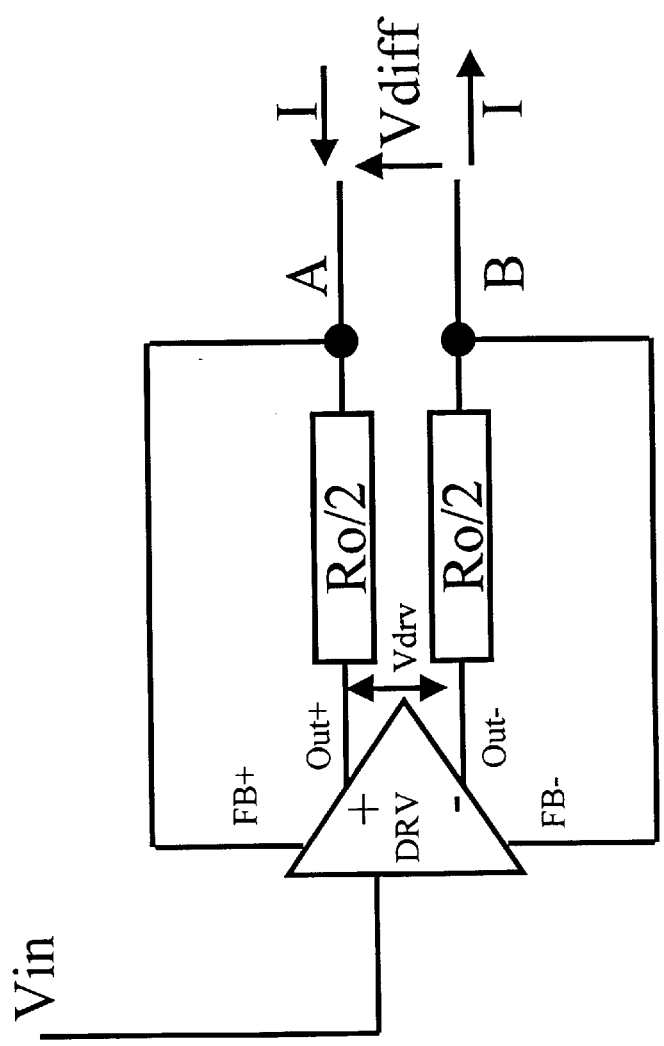
FIG. 2 shows a differential drive amplifier DRV of the hybrid circuit of FIG. 1 with usual circuitry around it, in order to perform a synthesis of impedance.

An explanation of the operation of the hybrid circuit follows by making also reference to the FIGS. 2 and 3. It is to be noted that components and signals that are similar in the different Figures are identically labeled in order to facilitate the understanding of the description.

A differential drive amplifier DRV adapted to perform a synthesis of impedance, with usual circuitry around it, is shown at FIG. 2. Therein, a single-ended or, preferably, a differential signal Vin is applied at an input of a driver DRV.

The driver DRV amplifies the signal Vin and provides a corresponding output signal Vdrv at its differential output terminals Out+ and Out−. The driver DRV also as feedback inputs FB+ and FB− that substantially have an infinite input impedance and to which the nodes A and B are respectively connected. Two resistors $$\frac{Ro}{2}$$

are connected between an output terminal Out+/Out− and a node A/B respectively. An output voltage Vdiff appears across the nodes A and B, whereat flows a current I as indicated by the arrows in FIG. 2.

A load that would be connected to the nodes A and B of the FIG. 2 can be represented by the Thevenin equivalent represented in FIG. 3. The load is equivalent to a voltage source Vth in series with an impedance Zth between nodes PN and NN. When the nodes PN and NN of the load are connected respectively to the nodes A and B, the output voltage Vdiff between the nodes A and B is:

$$Vdiff = Vin \cdot Gain \cdot \frac{Zth}{Zth + Ro} + Vth \cdot \frac{Ro \cdot SOI}{Ro \cdot SOI + Zth}$$

where Gain is the gain of the driver DRV, and SOI is the "Synthesis Of Impedance" factor which is an intrinsic characteristic of the driver DRV.

Figure 4:
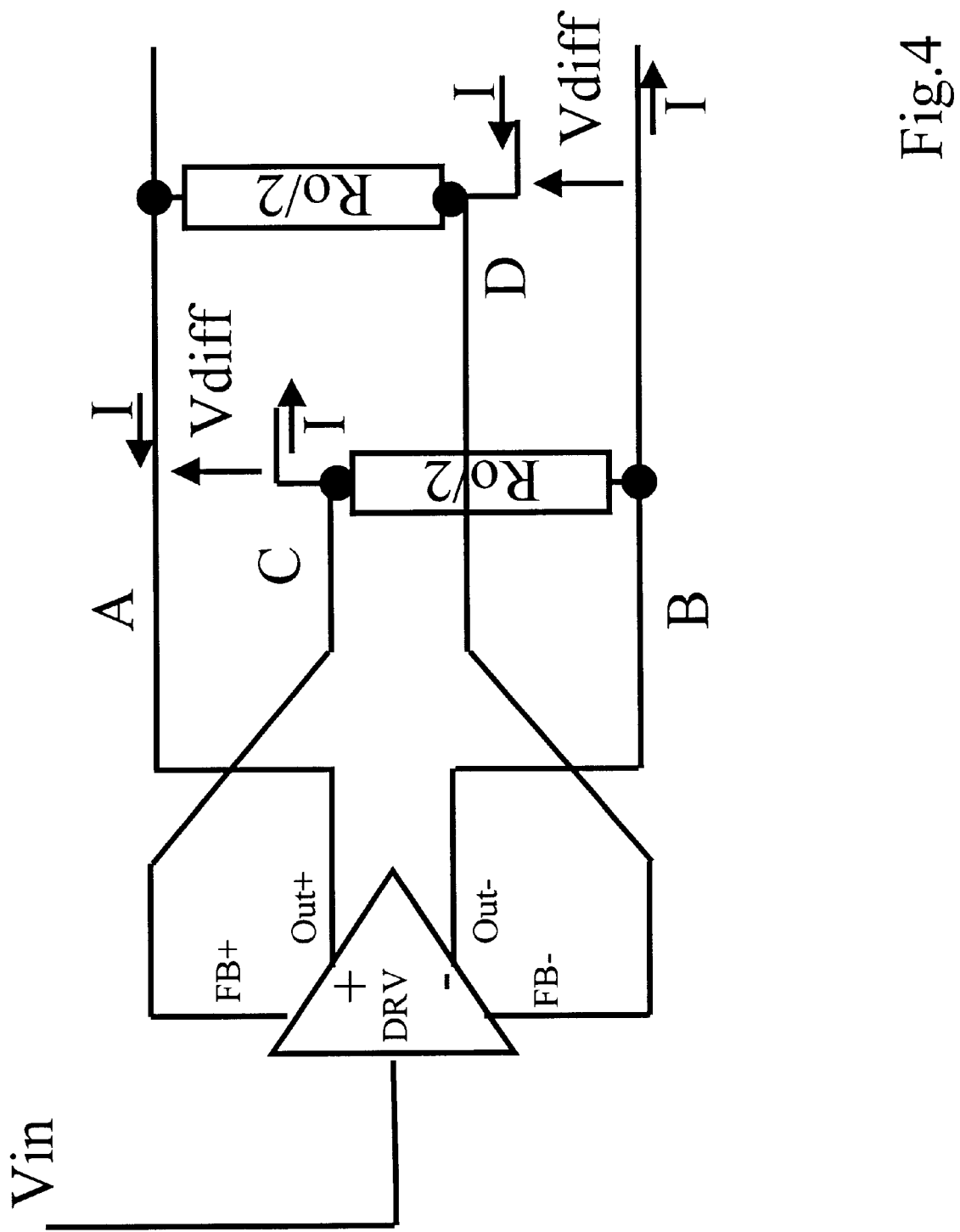
FIG. 4 shows the differential drive amplifier DRV of FIG. 1 with less usual circuitry around it, in order to perform a synthesis of impedance.
Figure 5:
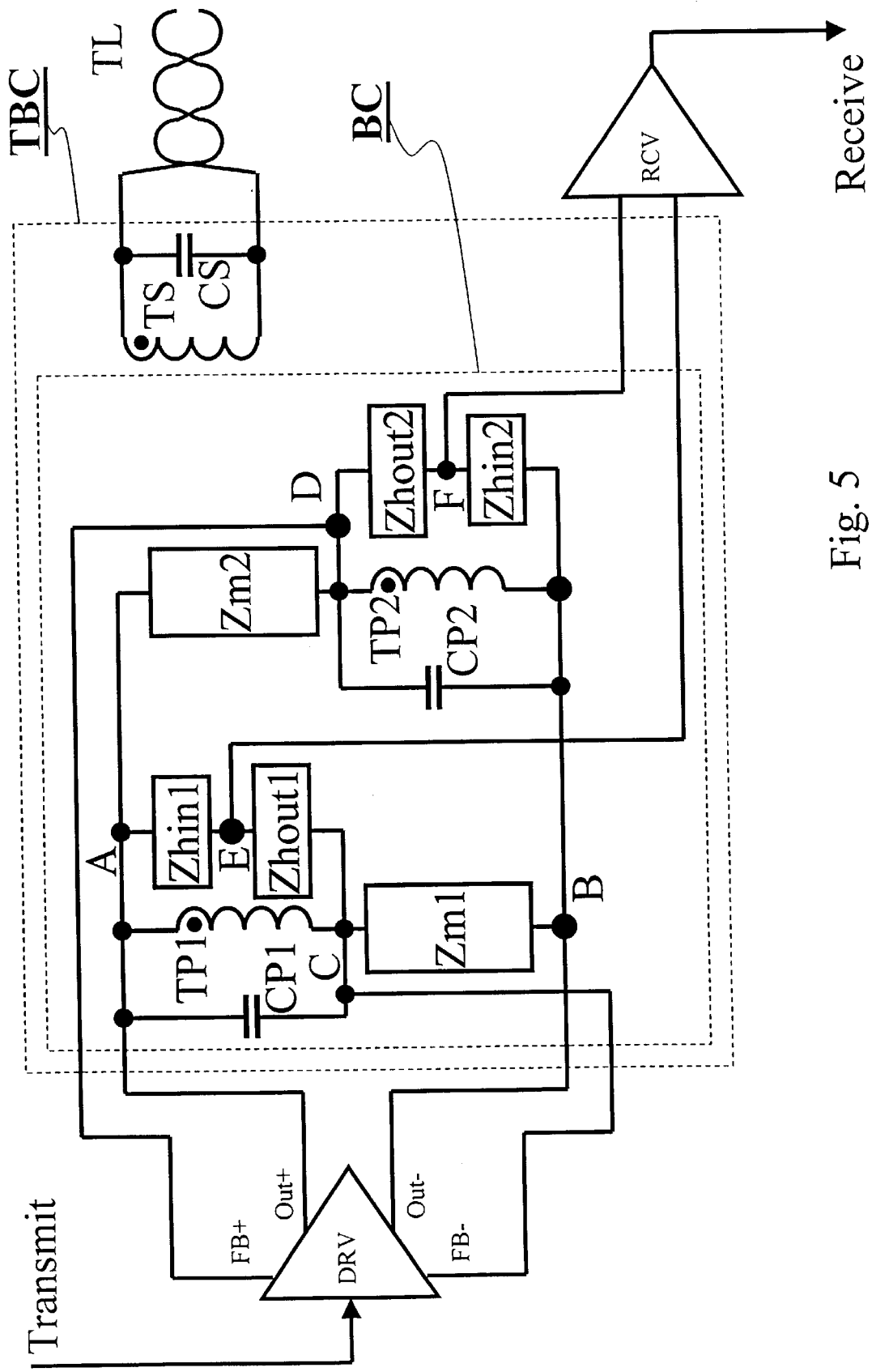
FIG. 5 represents a variant of the hybrid circuit of FIG. 1 with filtering components.

A differential drive amplifier DRV adapted to perform a synthesis of impedance but with less usual circuitry around it, is shown at FIG. 4. Therein, the nodes C and D are respectively connected to the feedback inputs FB+ and FB− of the driver DRV, whilst the output terminals Out+ and Out− are respectively connected to the nodes A and B. The two resistors $$\frac{Ro}{2}$$

are connected between the node A−D and B−C respectively. The output voltage Vdiff appears across the nodes A−C and B−D, whereat flows a current I as indicated by the arrows in FIG. 4.

In this circuit, two identical loads are supposed to be connected respectively across the nodes A−C and B−D. These loads can each be represented by an identical Thevenin equivalent, like the one represented at FIG. 3. As already mentioned, the loads are equivalents to a voltage source Vth in series with an impedance Zth. When nodes PN and NN of a first load are connected respectively to the nodes A and C, and nodes PN and NN of a second load are connected respectively to the nodes D and B, the output voltage Vdiff is:

$$Vdiff = Vin \cdot Gain \cdot \frac{Zth}{Zth + \frac{Ro}{2}} + Vth \cdot \frac{\frac{Ro}{2}}{\frac{Ro}{ISR} + Zth}$$

where ISR is the "Impedance Synthesis Ratio" of the driver DRV.

ISR is an intrinsic characteristic of the driver DRV that is related to the above SOI according to:

$$ISR = \frac{1}{-1 + 2 \cdot SOI}$$

ISR and SOI are positive natural numbers. On the one hand, ISR has a value comprised between 0 and 1 (1>ISR>0), with 0 indicating no synthesis of impedance and 1 indicating infinite synthesis of impedance. On the other hand, ISR is greater than 1 (SOI>1), with 1 indicating no synthesis of impedance.

Referring to FIG. 1, the drive amplifier or driver DRV performs a synthesis of impedance and can be characterized by its SOI or, equivalently, by its ISR. The first Zm1 and second Zm2 impedance matching networks, hereafter more generally called Zm because they are identical, include several passive and reactive components. Owing to these components, the impedance matching networks Zm provide together an impedance value selected based upon the impedance of the telecommunication line TL according to a formula given below.

The Impedance Synthesis Ratio ISR is equal to:

$$ISR = \frac{Zm \text{ with synthesis}}{Zm \text{ without synthesis}}$$

To simplify the following formulas, the above first input impedance Zhin1 and the second input impedance Zhin2 will be considered as being identical and will hereafter merely be referred to as Zhin. Similarly, the first output impedance Zhout1 and the second output impedance Zhout2 will also be considered as being identical and will hereafter merely be referred to as Zhout. Zhin and Zhout are complex impedances Their summed impedance is much higher than the impedance reflected into the primary windings TP1 and TP2 of the transformer, the impedance of the matching network Zm and the output impedance of the Out+/Out− terminals of the driver.

As already mentioned, the first primary winding TP1 of the transformer is connected between the nodes A and C, whilst the second primary winding TP2 of this transformer is connected between the nodes D and B. These two primary windings TP1 and TP2 are magnetically coupled to the secondary winding TS, that is connected to the telecommunication line TL. The turn ratio n of the transformer is defined by values 1/2:1/2: n for the first primary winding TP1:second primary winding TP2:secondary winding TS, respectively.

Each impedance matching network Zm presents an impedance that equals:

$$Zm = \frac{Zcoil}{ISR}$$

where Zcoil is the impedance reflected into one of the primary windings of the transformer.

In the hybrid circuit of FIG. 1, the value of Zcoil is:

$$Zcoil = \frac{Zline}{2 \cdot n^2}$$

where Zline is the impedance of the telecommunication line TL.

This impedance Zline is generally dependent on the line's characteristic impedance, its length, the impedance at the other end of the line and the frequency. This means that Zm is generally an approximation of its nominal value.

If the impedance Zm equals its nominal value, the values of Zhin and Zhout that give a perfect echo cancellation, i.e. an infinite trans-hybrid loss, are obtained by:

$$Zhout = Zhin \cdot \frac{(1 - ISR)}{(1 + ISR)}$$

Since Zhin and Zhout are defined by their relative value, these values may be adjusted so that the above assumption on their summed impedance is verified.

If, as already mentioned, Zm is only an approximation of its nominal value, the echo cancellation can be improved by building Zhin and Zhout such as to obtain:

$$Zhin = Zhout \cdot \frac{Zm + Zcoil}{Zcoil - Zm}$$

The gain from the line connection to the receive connection is:

$$\text{Gain\_Line\_RX} = \frac{ISR}{n}$$

To increase this gain, the transformer ratio n should be as small as possible. The minimal value $n_{min}$ for the turn ratio n depends on the maximum values $Vrx_{max}$, $Vtx_{max}$ and $Vx_{max}$:

$$n_{min} = \frac{(1 + ISR) \cdot Vtx_{max}}{2 \cdot Vx_{max}} + \frac{(1 - ISR) \cdot Vrx_{max}}{2 \cdot Vx_{max}}$$

where:

$Vrx_{max}$ is the differential peak-to-peak voltage of the signal received on the telecommunication line TL;

$Vtx_{max}$ is the maximum differential peak-to-peak voltage of the signal transmitted on the telecommunication line TL; and $Vx_{max}$ is the maximum differential peak-to-peak voltage at the output of the drive amplifier. $Vx_{max}$ is usually chosen to reduce distortion or clipping rate.

The voltage Vdrv across the outputs Out+ and Out− of the driver DRV, i.e. between the nodes A and B, is equal to:

$$Vdrv = \frac{Vtx \cdot (1 + ISR) + Vrx \cdot (1 - ISR)}{2 \cdot n}$$

The voltage Vrcv across the inputs of the receiver RCV, i.e. between the nodes E and F, is equal to:

$$Vrcv = Vrx \cdot \frac{ISR}{n}$$

The voltage Vtl at the secondary winding TS of the transformer, i.e. on the telecommunication line TL, is equal to:

Vtl=Vrx+Vtx

The gain from the input of the amplifier to the telecommunication line TL is:

$$\text{Gain\_in\_line} = \frac{Gain_{drv} \cdot 2 \cdot n}{1 + ISR}$$

where $Gain_{drv}$ is the gain of the drive amplifier DRV.

The impedance matching networks Zm1 and Zm2 may include various passive and reactive components that provides together an impedance value selected based upon the impedance of the telecommunication line reflected into the primary windings TP1 and TP2 of the transformer.

Additionally, reactive components, such as capacitors or coils, can be placed in series and/or in parallel with the primary TP1, TP2 and/or the secondary TS windings of the transformer in order to achieve filtering. In that case, the above value of Zcoil to take into account is rather the total impedance seen between the nodes A and C or D and B, neglecting the influence of the impedance dividers Zhin, Zhout.

In such preferred embodiments, the components placed in series or in parallel with the windings of the transformer will add to the impedance to take into account. The reactive components add a filtering effect in the transmit-to-line, transmit-to-receive, and line-to-receive transfer function of the hybrid circuit.

In a first possible variant, shown at FIG. 4, capacitors CP1, CP2 and CS are placed in parallel with the first primary winding TP1, the second primary winding TP2 and the secondary winding TS of the transformer, respectively. The impedance dividers Zhin, Zhout are then used to compensate for mismatch between the impedance of the matching networks Zm and the impedance seen between the nodes A and C or the nodes D and B looking to the telecommunication line TL through the transformer, and the reactive components, i.e. the capacitors, are added for filtering.

In other variants, not shown, a capacitor is connected in series with each of the primary windings of said transformer. The impedance dividers Zhin, Zhout are then coupled either across the nodes of the hybrid circuit, i.e. in parallel with the series connection of the capacitor and the primary winding, or only in parallel with the primary winding. In this latter case, the capacitor is coupled in series with the parallel-connected primary winding and impedance divider, across the nodes of the hybrid circuit.

Filtering may also be achieved by coupling reactive components between terminals of the secondary winding TS of the transformer and the telecommunication line. Each terminal of the secondary winding TS may for instance be coupled to a corresponding terminal of the telecommunication line TL via a distinct capacitor.

It is obvious that the above variants are only given as examples and that any combination of these variants, or of at least a portion thereof, may lead to possible embodiments of the hybrid circuit of the present invention.

It is to be noted that the above specification describes a differential drive amplifier, but that the outputs of two single-ended drivers that generate symmetrical voltages compared to a reference voltage can also be considered as equivalents to the outputs of a differential drive amplifier.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

What is claimed is:

1. Hybrid circuit adapted to couple a broadband modem to a telecommunication line (TL), said hybrid circuit comprising a transformer bridge circuit (TBC) including a bridge circuit (BC) coupled between a drive amplifier (DRV) and a receive amplifier (RCV), and a transformer of which a secondary winding (TS) is electrically coupled to said telecommunication line, said bridge circuit comprising first (A), second (B), third (C) and fourth (D) nodes interconnected via four legs, a first leg (B–C) comprising a first impedance matching network (Zm1) coupled across said second (B) and third (C) nodes, a second leg (A–C) comprising a first primary winding (TP1) of said transformer coupled across said first (A) and third (C) nodes, a third leg (A–D) comprising a second impedance matching network (Zm2) coupled across said first (A) and fourth (D) nodes, and a fourth leg (B–D) comprising a second primary winding (TP2) of said transformer coupled across said second (B) and fourth (D) nodes, the secondary winding of said transformer being magnetically coupled to said first and second primary windings, said drive amplifier having outputs (Out+, Out–) connected to said first and second nodes and being adapted to provide an output signal derived from a transmit signal received from said modem, and said receive amplifier having inputs coupled to said third and fourth nodes and being adapted to provide a receive output signal to be applied to said modem, characterized in that said drive amplifier (DRV) is a differential drive amplifier having feedback inputs (FB–, FB+) and being adapted to perform impedance synthesis, in that said third (C) and fourth (D) nodes are respectively connected to a first (FB–) and to a second (FB+) of said feedback inputs, and in that said bridge circuit (BC) further comprises a first impedance divider (Zhin1, Zhout1) coupled between said first (A) and third (C) nodes, and having a first central node (E) to which a first input of said receive amplifier (RCV) is connected, and a second impedance divider (Zhin2, Zhout2) coupled between said second (B) and fourth (D) nodes, and having a second central node (F) to which a second input of said receive amplifier is connected.

2. Hybrid circuit for telecommunication line according to claim 1, characterized in that said first (Zm1) and said second (Zm2) impedance matching networks have substantially identical impedance values, and in that said first (Zhin1, Zhout1) and said second (Zhin2, Zhout2) impedance dividers have substantially identical impedance values.

3. Hybrid circuit for telecommunication line according to claim 1, characterized in that said second (A–C) and fourth (B–D) legs each further comprise a reactive component.

4. Hybrid circuit for telecommunication line according to claim 3, characterized in that said reactive component is a capacitor (CP1; CP2) connected in parallel with the corresponding primary winding (TP1; TP2) of said transformer.

5. Hybrid circuit for telecommunication line according to claim 3, characterized in that said reactive component is a capacitor connected in series with the corresponding primary winding (TP1; TP2) of said transformer.

6. Hybrid circuit for telecommunication line according to claim 5, characterized in that in each of said second (A–C) and fourth (B–D) legs, the impedance divider (Zhin1, Zhout1; Zhin2, Zhout2) is connected in parallel with the primary winding (TP1; TP2) of said transformer.

7. Hybrid circuit for telecommunication line according to claim 1, characterized in that a capacitor (CS) is connected in parallel with said secondary winding (TS) of said transformer.

8. Hybrid circuit for telecommunication line according to claim 1, characterized in that said secondary winding (TS) of said transformer is electrically coupled to said telecommunication line (TL) via at least one capacitor.

9. Hybrid circuit for telecommunication line according to claim 1, characterized in that said telecommunication line (TL) belongs to a Plain Old Telecommunication System (POTS).

10. Hybrid circuit for telecommunication line according to claim 1, characterized in that said telecommunication line (TL) belongs to an Integrated Services Digital Network (ISDN).

* * * * *